United States Patent
Anderson et al.

(10) Patent No.: US 6,855,198 B2
(45) Date of Patent: Feb. 15, 2005

(54) HYDROXYETHYL STARCH COMPOSITION AND USE IN PAPER PRODUCTS

(75) Inventors: Kevin R. Anderson, Cedar Rapids, IA (US); David E. Garlie, Eau Claire, WI (US)

(73) Assignee: Cargill, Incorporated, Minneapolis, MN (US)

(*) Notice: Subject to any disclaimer, the term of this patent is extended or adjusted under 35 U.S.C. 154(b) by 41 days.

(21) Appl. No.: 10/636,187

(22) Filed: Aug. 7, 2003

(65) Prior Publication Data

US 2004/0123776 A1 Jul. 1, 2004

Related U.S. Application Data

(63) Continuation-in-part of application No. 09/347,377, filed on Jul. 6, 1999, now abandoned.

(51) Int. Cl.[7] .................... C09D 103/08; D21H 17/28

(52) U.S. Cl. .................. 106/206.1; 106/215.2; 162/175; 428/533

(58) Field of Search .................. 106/206.1, 215.2; 162/175; 428/533

(56) References Cited

U.S. PATENT DOCUMENTS 4,786,530 A * 11/1988 Fox ........................... 427/384

* cited by examiner

Primary Examiner—David Brunsman
(74) Attorney, Agent, or Firm—Grace P. Malilay; Harry J. Gwinnell

(57) ABSTRACT

A hydroxyethyl starch composition including dent corn starch and waxy corn starch wherein a portion of at least one, and preferably both, of the dent corn starch and the waxy corn starch are hydroxyethyl starch. Also disclosed are paper products comprising a fibrous web having applied thereon the starch compositions.

12 Claims, No Drawings

HYDROXYETHYL STARCH COMPOSITION AND USE IN PAPER PRODUCTS

CROSS REFERENCE TO RELATED APPLICATIONS

This application is a continuation-in-part application of U.S. application Ser. No. 09/347,377 filed Jul. 6, 1999 now abandoned.

FIELD OF THE INVENTION

The present invention is directed to starch compositions and paper products incorporating the starch compositions. In particular, the invention is directed to starch compositions usable, for example, as additives in the manufacture of paper products.

BACKGROUND

Various paper products can be manufactured from fibers. These products are often manufactured using an aqueous slurry of fibers that include modified cellulose fibers derived from various plant sources. In a papermaking process, water is removed from the slurry in a controlled manner to form a web, which can be subsequently pressed and dried to form a final paper product.

In the preparation of paper, commonly used materials for surface sizing agents are starches and modified starches, including oxidized, enzyme-converted, hydroxyethylated, and cationic starches. These sizing agents can have the benefit of improving strength, and reducing porosity of the paper product. Dent corn starch is relatively inexpensive sizing agent compared to other products, and has reasonably good sizing properties. Unfortunately, dent corn starch is known to retain fatty acids, which can be a problem because fatty acids may interfere with the runability of the paper machine. In addition, dent corn starch is often applied to paper webs at sufficient high loading values that the starch is a significant papermaking expense. Also, machine speeds may often be reduced in order to accommodate for the addition of the dent corn starch sizing agent due to the additional steam usage needed for drying the starch sized paper.

Therefore, a need exists for an improved starch composition that may be used to improve strength and reduce porosity of paper products, and will allow papermakers to increase machine speeds while making stronger and lighter sheets.

SUMMARY OF THE INVENTION

The present invention is directed to starch compositions and paper products using the starch compositions. The starch compositions of the invention are particularly useful when added to paper during dry-end processing on a papermaking machine.

The starch compositions comprise from about 1 to about 99 weight percent, preferably about 50 to about 95 weight percent, dent corn starch based upon total starch weight, and from about 1 to about 99 weight percent, preferably from about 5 to about 50 weight percent waxy corn starch based upon total starch weight, wherein a portion of at least one of the dent corn starch and the waxy corn starch is a hydroxyethyl starch. The present invention is also directed to paper products that are produced using starch compositions of the invention.

DETAILED DESCRIPTION OF THE INVENTION

The present invention is directed to starch compositions and paper products using the starch compositions. The starch compositions of the invention are particularly useful when added to paper during dry-end processing on a papermaking machine.

The starch compositions comprise from about 1 to about 99 weight percent, preferably about 50 to about 95 weight percent, dent corn starch based upon total starch weight, and from about 1 to about 99 weight percent, preferably from about 5 to about 50 weight percent waxy corn starch based upon total starch weight, wherein a portion of at least one of the dent corn starch and the waxy corn starch is a hydroxyethyl starch. The present invention is also directed to paper products that are produced using starch compositions of the invention.

In the present invention, there is utilized dent corn starch. Dent corn starch is starch derived from dent corn, and the granule is a mixture of polymers ranging from a linear amylose fraction to a highly branched amylopectin fraction. Percentages of each fraction in dent corn starch are approximately 27% amylose and 73% amylopectin.

Also utilized in the starch compositions of the present invention is waxy corn starch. Waxy corn starch, which is corn starch derived from waxy corn, has virtually no amylose and is considered to be essentially 100% amylopectin.

The amylose polymer of the starch is linear and is comprised of repeating units of glucose connected in an alpha-D-(1,4) glucoside linkage. The glucose repeating units may form a 3-D helix configuration, that provides binding and Theological properties, including retention of fatty acids.

The amylopectin fraction of the starch granule is composed of polymers that are much larger than the linear amylose polymers. The amylopectin polymer has a branched configuration. Amylopectin polymer forms by polymerization of the linear alpha-D-(1,4) fractions, during which branch points are created at the number 6 carbon atom hydroxyl group of the glucose molecule. As these branch points occur periodically along the linear chain, a large three dimensional network may develop. The branched structure of the amylopectin polymer reduces its ability to align itself with other amylose or amylopectin polymer chains, also resulting in unique rheological properties. As used herein, amylose and amylopectin include both native and modified polymers.

The starch compositions of the present invention are prepared, using any conventional technique, by combining the dent corn starch and the waxy corn starch. The starch compositions are hydroxyethylated, such as by reaction with ethylene oxide, to add hydroxyethyl groups to the starch polymers. The weight of hydroxyethyl groups in the starch composition is about 0.5 to about 2.5%, and preferably about 1.0 to about 2.0 percent, of the total weight of dry starch. In an alternative embodiment, a portion of the starch may be hydroxyethylated, after which the hydroxyethyl starch is combined with the remaining portion of non-hydroxyethylated starch to provide a partially hydroxyethylated starch composition.

The starch composition is hydroxyethylated to add hydroxyethyl groups to the starch polymers. Hydroxyethylation results in a product having good viscosity stability and hydrolytic stability under a wide range of conditions. Hydroxyethyl starch may be produced by reacting ethylene oxide with the starch composition under alkaline conditions. The preparation of hydroxyethyl starch products may be done commercially on a large scale using a starch slurry produced by wet corn milling. The use of starch slurry is advantageous because the reactions can be carried out using slurry concentrations of 35 to 45%. The resulting products can subsequently be filtered, washed, and dried.

An initial step in hydroxyethylation is making the starch slurry alkaline by adding preferably 1% to 2%, based on dry starch, of an alkali or alkaline earth metal hydroxide. The starch should be kept in suspension by agitation to prevent localized pasting. Sodium sulfate can be added to the slurry prior to caustic addition, or it can be combined with the caustic to help prevent localized pasting during the addition.

Ethylene oxide is added to the slurry in a manner to ensure efficient solubilization, such as by use of a dip-leg. The hydroxyethylation reaction is usually conducted at 25° C. to 50° C. Higher temperatures may result in swelling of the starch granules, which makes filtration difficult, while lower temperatures often require excessively long reaction times. Upon completion of the ethylene oxide reaction, the slurry is often made acidic by the addition of a mineral acid and the starch polymers are de-polymerized in the granule state, to a pre-determined viscosity level. The resultant slurry is then neutralized, filtered, and washed to remove salt and soluble organic by products.

Hydroxyethyl starch, made via the aqueous slurry reaction, is very similar in appearance to unmodified starch, but the two differ greatly in many of their other properties. The presence of hydroxyethyl groups reduces the amount of energy needed to solubilize the starch in water. Thus, hydroxyethyl starch has a lower pasting temperature than unmodified starch. In addition, once solubilized, reassociation of the starch chains is inhibited. Therefore, solutions of hydroxyethyl starch have improved viscosity stability, better clarity, a reduced tendency to retrograde, and increased cohesiveness. Films are clearer and more flexible than those of unmodified starch.

Since the hydroxyethyl group is nonionic, hydroxyethyl starch does not cause flocculation of pigments or fillers. Pastes are also more stable to salts and hard water than pastes of cationic or anionic starches. The ether linkage is stable to acids and bases so that hydroxyethyl starch can be used over a wide pH range without sacrificing its desirable properties.

In addition, the improved starch composition preferably has a fatty acid concentration of less than 2.0 weight percent based upon total starch weight, and more preferably less than 1.0 weight percent based upon total starch weight.

The hydroxyethyl starch composition of the invention may be used as a sizing agent for sizing of various webs, including wood-fiber webs such as paper and paperboard. The sized webs can include a fibrous material and a sizing agent applied to the fibrous material. The starch composition of the present invention can result in a product having favorable sized properties. These properties can include enhanced surface strength, reduced porosity, and lower fatty acid content which may impart cleaner running to papermaking machines. In particular, the invention can allow for equal, or better, surface strength properties of wood-fiber webs at lower starch incorporation rates, and can also create a reduction in the amount of fatty acid contaminants in the starch composition. This reduction improves the paste clarity and cleanliness of the sizing agent.

The starch compositions of the present invention are applied to the fibrous web using any conventional technique. For example, the starch compositions may be applied at the size press of a papermaking process, or at the calendar stack at the dry-end of papermaking machines. In this respect an aqueous starch solution containing from about 1 to about 30 percent, preferably from about 5 to about 15 percent by weight starch to total solution weight, may be used at the size press in order to achieve starch pickup.

Heavier papers and boards may be surface-sized at the calendar starch in order to improve calendaring action and obtain a smooth, scuff-resistant surface for printing. Application of the sizing agent is usually by means of a water box with a reinforced rubber lip contacting the machine calendar roll. A sizing blade can also be used to distribute and apply the sizing agent. The sizing agent is carried on the roll surface into the calendar nip where it is applied to the board.

Improved gloss, printability, and resistance to oily materials can result when hydroxyethyl starch is used in paper and paperboard manufacturing. These properties are often essential for high-quality writing paper, magazine stock, and paper that is to be used in contact with grease or oil (e.g. butcher wrap, pastry boxes, margarine cartons). The viscosity stability of hydroxyethyl starch paste facilitates uniform application on the paper during coating and sizing. Hydroxyethyl starch is compatible with most components of commercially used size formulations and coating colors.

The following examples are presented to illustrate the present invention and to assist one of ordinary skill in making and using the same. The examples are not intended in any way to otherwise limit the scope of the invention.

EXAMPLES

Test Procedures

In carrying out the following examples, the following test procedures can be used:

Method for Determining % Hydroxyethyl Substitution

Hydroxyethyl substitution can be determined according to Corn Refiners Association (CRA) Standard Analytical Methods number C-31 (Seventh Edition).

Strength Determinations on Paper

Internal Bond Strength of Paper (Scott Bond)—Tappi Test Procedure T 541 om-89

Bursting Strength of Paper—Tappi Test Procedure T 403 om-97

Surface Strength of Paper (Wax Pick)—Tappi Test Procedure T 459 om-93

Porosity of Paper

Air permeability of paper and paperboard (Parker Print-surf method)

The Porosity of paper samples can be measured using a Parker Print-surf instrument (Model PPS 90) fitted with an optional measuring head for porosity in place of the roughness measuring head. Test samples are clamped between two platens at a constant pressure. A volume of air is passed through the test sample and the instrument records porosity in SI units of micrometer/Pascal, Bendtsen units of milliliters/minute, or Gurley units of seconds/100 ml. This method utilizes instrumentation and methodology as outlined in Tappi Test Procedure T 555 pm-94, Roughness of paper and paperboard (Print-surf method).

Determination of Fatty Acid Content in Hydroxyethyl Starch

Procedure

1. Weigh 50 g (+0.1 g) oven dried weight of starch sample. Put into a 43×125 mm Soxhlet Extraction thimble. Plug the top of thimble with fat-free cotton, and secure on the Soxhlet Extractor.
2. Add approximately 250 mL of methanol into a 500 mL ground glass flask. Secure on a Soxhlet Extractor and plug the heater cord into outlet. Make certain that cooling water circulates through condensers and that all connections are leak-free. Continue reflux extraction for sixteen (16) hours.

3. After sixteen (16) hours, disconnect the flask and remove the 500 mL flask with its contents and evaporate off the solvent with a Rotoevaporator in the hood.

4. Remove the contents in the flask by rinsing with a small amount of fresh methanol to a pre-weighed aluminum dish. Be sure all methanol vapors are gone before placing in the oven.

Calculations $$\% \, FA = \frac{\text{Weight of extractables}}{\text{Starch Sample wt. (g)}} \times 100$$

Example 1

Synthesis of Hydroxyethyl Dent Corn Starch

Hydroxyethyl dent corn starch was prepared by charging a reactor with 144,000 lbs dry substance dent corn starch as a 23 baume slurry to which sodium sulfate (4.5% by dry weight on the dry starch), and sodium hydroxide (1.3% by dry weight on the dry starch) had been added. The reaction mixture was heated to 41° C. and ethylene oxide (3.1% by weight on the dry starch) was added to the alkaline slurry. After 14 hours of reaction, a 5-liter sample of reacted slurry was removed from the reactor and sulfuric acid was added to reduce the pH of the slurry to 0.75. The slurry was reacted with sulfuric acid at a temperature of 45° C. for a period of 10–15 hours to achieve a reduced paste viscosity. The acidified slurry was then neutralized with sodium carbonate to a neutral pH. The product was filtered to a cake, the cake washed with water, and the resultant washed cake allowed to air dry to ambient moisture levels (10–12% $H_2O$) to give a hydroxyethyl dent corn starch containing a hydroxyethyl substitution of 2.1% on a dry starch weight basis.

Example 2

Synthesis of Hydroxyethyl Waxy/Dent Starch 20:80

Hydroxyethyl dent corn starch was prepared by charging a reactor with 144,000 lbs dry substance dent corn starch as a 23 baume slurry to which sodium sulfate (4.5% by dry weight on the dry starch), and sodium hydroxide (1.3% by dry weight on the dry starch) had been added. The reaction mixture was heated to 41° C. and ethylene oxide (3.1% by weight on the dry starch) was added to the alkaline slurry. A 30-liter portion of the reaction mixture was removed from the hydroxyethyl starch reactor 1 hour after the ethylene oxide addition was completed.

3220 g of dry waxy starch was slurried in 5025 g of water to a 22 baume suspension. To this suspension was added 483 g of anhydrous sodium sulfate (dry weight basis) with stirring, followed by the addition of 48.3 g of sodium hydroxide (dry weight basis) as a 6% solution (805 g). A 1361 g portion of the alkaline, waxy suspension was transferred to a 5-liter reaction flask, followed by the addition of 4528 g of the ethylene oxide treated dent starch reaction mixture. The reaction vessel was sealed and heated to 41° C. and allowed to react 17 hours with agitation. In this manner, the waxy corn starch was reacted with the ethylene oxide in addition to the dent corn starch. After the reaction, the pH of the waxy/dent starch mixture was adjusted with sulfuric acid to 0.75, and reacted for 10-15 hrs at 45° C. to achieve a reduced paste viscosity. The acidic reaction mixture was then adjusted with sodium carbonate to a neutral pH. The product was filtered to a cake, the cake was washed with water, and the resultant washed cake allowed to air dry to ambient moisture levels (10-12% $H_2O$) to give a 20:80 blend of hydroxyethyl waxy/dent corn starch containing a hydroxyethyl substitution of 1.4% on a dry starch weight basis.

Example 3

Synthesis of Hydroxyethyl Waxy/Dent Starch 50:50

Hydroxyethyl dent corn starch was prepared by charging a reactor with 144,000 lbs dry substance dent corn starch as a 23 baume slurry to which sodium sulfate (4.5% by dry weight on the dry starch), and sodium hydroxide (1.3% by dry weight on the dry starch) had been added. The reaction mixture was heated to 41° C. and ethylene oxide (3.1% by weight on the dry starch) was added to the alkaline slurry. A 30-liter portion of the reaction mixture was removed from the hydroxyethyl starch reactor 1 hour after the ethylene oxide addition was completed.

3220 g of dry waxy starch was slurried in 5025 g of water to a 22 baume suspension. To this suspension was added 483 g of anhydrous sodium sulfate (dry weight basis) with stirring, followed by the addition of 48.3 g of sodium hydroxide (dry weight basis) as a 6% solution (805 g). A 3401 g portion of the alkaline, waxy suspension mixture was transferred to a 5-liter reaction flask, followed by 2488 g of the ethylene oxide treated dent starch reaction mixture. The reaction vessel was sealed and heated to 41° C. and allowed to react 17 hours with agitation. In this manner, the waxy corn starch was reacted with the ethylene oxide in addition to the dent corn starch. After the reaction, the pH of the waxy/dent starch mixture was adjusted with sulfuric acid to 0.75, and reacted for 10-15 hrs at 45° C. to achieve a reduced paste viscosity. The acidic reaction mixture was then adjusted with sodium carbonate to a neutral pH. The product was filtered to a cake, the cake was washed with water, and the resultant washed cake allowed to air dry to ambient moisture levels (10-12% $H_2O$) to give a 50:50 blend of hydroxyethyl waxy/dent corn starch containing a hydroxyethyl substitution of 0.7% on a dry starch weight basis.

Example 4

Paper Production

Paper was produced on the Lou Calder Fourdrinier paper machine at Western Michigan University, Kalamazoo, Mich. The paper machine has a puddle-type size press to which starch paste solutions can be applied to the paper web, which is subsequently dried. The pulp stock was a 60:40 blend of hardwood/softwood refined in a Jordan refiner to a Canadian Standard Freeness of 400. The paper stock contained 15% mineral filler as a 2:1 mixture of precipitated calcium carbonate and clay. Alkenyl succinic anhydride (AKD) was added continuously as an internal sizing agent and a cationic wet end starch with a nitrogen content of 0.32% by dry weight was added continuously at a 0.25% addition rate based on fiber. The paper machine speed was set at 80 feet per minute. The control paper was prepared with no size press starch added. The starches of Examples 1, 2, and 3 were jet cooked and adjusted to 6% and 11% solids and added in turn to the size press for application to a 46 lb (per 3000 $ft^2$) basis weight paper web. Starch pick-up rates were determined by volume consumption of the starch paste solution per unit paper weight over a determined time frame. Test papers of the different starches and conditions were taken off the pick-up reel and placed in a TAPPI standard temperature and humidity control room for 24 hours prior to testing.

Paper tests results were as follows:

| Sample | Internal Bond | % Inc.[2] | Burst (kPa) | % Inc.[2] | Wax Pick (Felt) | % Inc.[2] | Porosity (mL/min) | % Dec.[3] | Starch Pick-Up #/ton[4] |
|---|---|---|---|---|---|---|---|---|---|
| Control[1] | 51 | 0 | 50 | 0 | 2.0 | 0 | 1347 | 0 | 0 |
| Example 1 | | | | | | | | | |
| 6% | 62 | 21.6 | 127 | 154 | 9.0 | 350 | 1319 | 2.1 | 54 |
| 11% | 78 | 52.9 | 180 | 260 | 13.3 | 565 | 1140 | 15.4 | 110 |
| Example 2 | | | | | | | | | |
| 6% | 63 | 23.5 | 142 | 184 | 9.3 | 365 | 1176 | 12.7 | 40 |
| 11% | 104 | 104 | 200 | 300 | 14.7 | 635 | 1042 | 22.6 | 88 |
| Example 3 | | | | | | | | | |
| 6% | 74 | 45.1 | 147 | 194 | 10.7 | 435 | 1153 | 14.4 | 46 |
| 11% | 114 | 124 | 200 | 300 | 15.3 | 665 | 932 | 30.8 | 113 |

Control[1] - Paper produced with no size press starch.
% Inc.[2] - Percentage Increase
% Dec.[3] - Percentage Decrease
/ton[4] - Pounds of starch per ton of paper fiber From the above data, it is observed that the use of the starch composition of the present invention results in the preparation of paper having strength properties that are significantly improved relative to a control paper produced in the absence of a surface applied starch. Furthermore, the paper products of the present invention also have improved strength properties relative to the paper products prepared with hydroxyethyl dent corn starch.

In addition, it is observed that use of the starch compositions of the present invention result in the preparation of paper having reduced porosity as compared with the control that has no added surface applied starch, and also as compared with the use of hydroxyethyl dent corn starch.

From the above data, it is also observed that the use of the starch composition of the present invention, in general, results in the preparation of paper having a reduced starch pick-up relative to the paper products prepared with hydroxyethyl dent corn starch.

Example 5

Paper Production

A waxy/dent starch composition was prepared as follows. Waxy corn was wet-milled to give a starch slurry mixture in a ratio of 95:5 waxy/dent. The slurry was added to a reactor to give a total of 144,000 lbs dry substance starch. Sodium sulfate (4.5% by dry weight on the dry starch), and sodium hydroxide (1.3% by dry weight on the dry starch) were added, and the reaction mixture was heated to 41° C. followed by the addition of ethylene oxide (3.4% by weight on the dry starch). After a period of 14–20 hours of reaction, sulfuric acid was added to reduce the pH of the slurry to 1.0. The slurry was reacted with sulfuric acid at a temperature of 45° C. for a period of 10–15 hours to achieve a reduced paste viscosity. The acidified slurry was then neutralized with sodium carbonate to a neutral pH. The product was filtered to a cake, the cake was washed with water, and the resultant washed cake flashed dried in a production scale flash dryer to produce a waxy/dent hydroxyethyl corn starch with a hydroxyethyl content of 1.8%. Paper was produced on a commercial machine (Paper Machine #2 Potlatch, Lewiston, Id.) running a calendar stack non-hydroxyethylated waxy acid thinned starch running at 8.0% solids as a control, to manufacture a 17.7-point milk carton grade paperboard. The waxy/dent hydroxyethyl starch composition from above was atmospherically cooked and applied to the calendar stack at 6.0% solids to also manufacture the 17.7-point milk carton paperboard. Due to the lower starch solids, the starch composition reduced the starch pick-up at the calendar stack and allowed the machine speed to increase 25 feet per minute with no loss of surface strength properties. The milk carton grade is run to a caliper, and the application of the starch composition allowed for a reduction of fiber, resulting in lower basis weight, to compensate for the higher caliper when running the starch composition relative to the control.

Example 6

Fatty Acid Determination in Hydroxyethyl Waxy/Dent Starch

A waxy/dent starch composition was prepared as follows. Waxy starch slurry was combined with dent corn starch slurry in a ratio of 30:70 waxy/dent, as measured by a mass flow meter, in a reactor to give a total of 144,000 lbs dry substance starch. Sodium sulfate (4.5% by dry weight on the dry starch), and sodium hydroxide (1.3% by dry weight on the dry starch) were added, and the reaction mixture was heated to 41° C. followed by the addition of ethylene oxide (2.2% by weight on the dry starch). After a period of 14–20 hours of reaction, sulfuric acid was added to reduce the pH of the slurry to 1.0. The slurry was reacted with sulfuric acid at a temperature of 45° C. for a period of 10–15 hours to achieve a reduced paste viscosity. The acidified slurry was then neutralized with sodium carbonate to a neutral pH. The product was filtered to a cake, the cake was washed with water, and the resultant washed cake flashed dried in a production scale flash dryer to produce a waxy/dent hydroxyethyl corn starch with a hydroxyethyl content of 1.2%. A portion of this dried starch product, referred to as Starch A (30:70 waxy/dent ratio), was analyzed for fatty acid content by the procedure outlined in the Test Methods for Determining Fatty Acid Content with the following results:

Starch A=0.649% extractables (average of 2 determinations)

The invention has been described with reference to various specific and illustrative embodiments and techniques.

However, one skilled in the art will recognize that many variations and modifications may be made while remaining within the spirit and scope of the invention.

What is claimed is:

1. A starch composition comprising:

from about 1 to about 99 weight percent dent corn starch based upon total starch weight and from about 1 to about 99 weight percent waxy corn starch based upon total starch weight, wherein a portion of at least one of the dent corn starch and the waxy corn starch is a hydroxyethyl starch.

2. The starch composition according to claim 1, wherein the starch composition comprises from about 50 to about 95 weight percent dent corn starch based upon total starch weight and from about 5 to about 50 weight percent waxy corn starch based upon total starch weight.

3. The starch composition according to claim 1, wherein the starch composition comprises a hydroxyethyl substitution of about 0.5 to about 2.5 weight percent hydroxyethyl groups.

4. The starch composition according to claim 1, wherein the starch composition comprises a hydroxyethyl substitution of about 1.0 to about 2.0 weight percent hydroxyethyl groups.

5. The starch composition according to claim 1, wherein the starch composition has a fatty acid concentration of less than 1.0 weight percent based upon total starch weight.

6. The starch composition according to claim 1, wherein a portion of the dent corn starch and a portion of the waxy corn starch are hydroxyethyl starch.

7. A paper product comprising a fibrous web having applied thereon the starch composition of claim 1.

8. The paper product according to claim 7, wherein the starch composition comprises from about 50 to about 95 weight percent dent corn starch based upon total starch weight and from about 5 to about 50 weight percent waxy corn starch based upon total starch weight.

9. The paper product according to claim 7, wherein the starch composition comprises a hydroxyethyl substitution of about 0.5 to about 2.5 weight percent hydroxyethyl groups.

10. The paper product according to claim 7, wherein the starch composition comprises a hydroxyethyl substitution of about 1.0 to about 2.0 weight percent hydroxyethyl groups.

11. The paper product according to claim 7, wherein the starch composition has a fatty acid concentration of less than 1.0 weight percent based on total starch weight.

12. The paper product according to claim 7, wherein a portion of the dent corn starch and a portion of the waxy corn starch of the starch composition are hydroxyethyl starch.

* * * * *